(12) United States Patent
Cilliers

(10) Patent No.: US 10,343,877 B2
(45) Date of Patent: Jul. 9, 2019

(54) COMPONENT FOR REPLACING PIPES, METHOD OF USE, AND KIT OF PARTS FOR USE IN REMOVING PIPES

(71) Applicant: KOBUS SERVICES LIMITED, Tamworth (GB)

(72) Inventor: Jacobus Hendrik Cilliers, Halesowen (GB)

( * ) Notice: Subject to any disclaimer, the term of this patent is extended or adjusted under 35 U.S.C. 154(b) by 0 days.

(21) Appl. No.: 15/602,070

(22) Filed: May 22, 2017

(65) Prior Publication Data

US 2018/0002146 A1    Jan. 4, 2018

(30) Foreign Application Priority Data

May 23, 2016  (GB) .................................. 1609000.3

(51) Int. Cl.
*B66D 1/08*      (2006.01)
*F16L 23/028*    (2006.01)
(Continued)

(52) U.S. Cl.
CPC ................ *B66D 1/08* (2013.01); *B66D 1/14* (2013.01); *B66D 1/72* (2013.01); *F16L 1/032* (2013.01);
(Continued)

(58) Field of Classification Search
CPC .............. F16L 55/18; F16L 1/032; F16L 1/06
See application file for complete search history.

(56) References Cited

U.S. PATENT DOCUMENTS 2,249,119 A * 7/1941 Di Palma ................ B25B 27/02
                                                    24/115 N
4,736,978 A * 4/1988 Cielker .................. H02G 1/083
                                                    254/134.3 FT (Continued)

FOREIGN PATENT DOCUMENTS

DE    202005020694 U1    7/2006
WO       2008071997 A1    6/2008
(Continued)

OTHER PUBLICATIONS

Machine translation of description of DE 20 2005 020 694 U1, Jul. 27, 2006.

(Continued)

*Primary Examiner* — Tara Mayo-Pinnock
(74) *Attorney, Agent, or Firm* — Pedersen & Company, PLLC; Ken J. Pedersen; Barbara S. Pedersen

(57) ABSTRACT

This invention relates to an improved component (10) for replacing pipes, in particular underground pipes. The invention also relates to a trenchless method of removing pipes using the improved component, and a kit of parts for use in removing pipes. The improved component (10) is securable to a cable (14) and has a body (30) with a recess (26) to accommodate the end (18) of the pipe (12) in use, the recess being surrounded by a collar (24). The improved component is a two-part component, the first part (20) being securable to the cable (14) and the second part (22) including the body, the two parts being made of different materials. There is also provided a kit of parts including cooperating alignment elements of standard dimensions, and a method of removing an underground pipe.

13 Claims, 2 Drawing Sheets

(51) Int. Cl.
*B66D 1/14* (2006.01)
*B66D 1/72* (2006.01)
*F16L 19/025* (2006.01)
*F16L 3/16* (2006.01)
*F16D 3/04* (2006.01)
*F16L 1/032* (2006.01)
*F16L 1/06* (2006.01)
*F16L 55/16* (2006.01)
*H02G 1/08* (2006.01)

(52) U.S. Cl.
CPC ............... *F16L 1/06* (2013.01); *F16L 19/025* (2013.01); *F16L 23/0283* (2013.01); *F16L 55/1608* (2013.01); *F16D 3/04* (2013.01); *F16L 3/16* (2013.01); *H02G 1/08* (2013.01)

(56) References Cited

U.S. PATENT DOCUMENTS

| | | | | |
|---|---|---|---|---|
| 4,955,755 A * | 9/1990 | Frey | ............................ | E03F 3/06 138/97 |
| 5,232,205 A | 8/1993 | McVaugh | | |
| 5,314,166 A | 5/1994 | Muir | | |
| 5,328,297 A | 7/1994 | Handford | | |
| 7,624,817 B2 * | 12/2009 | Putnam | ...................... | E21B 7/30 175/53 |
| 2004/0218982 A1 * | 11/2004 | Wentworth | ............... | E21B 7/30 405/184.3 |
| 2010/0178113 A1 * | 7/2010 | Tjader | ...................... | E21B 7/205 405/184.3 |
| 2012/0093586 A1 | 4/2012 | Tjader | | |

FOREIGN PATENT DOCUMENTS

| | | |
|---|---|---|
| WO | 2010084340 A2 | 7/2010 |
| WO | 2016063079 A1 | 4/2016 |

OTHER PUBLICATIONS

PCT International Search Report and Written Opinion, PCT/GB2015/053182, dated Jan. 22, 2016, Applicant: Cilliers.

* cited by examiner

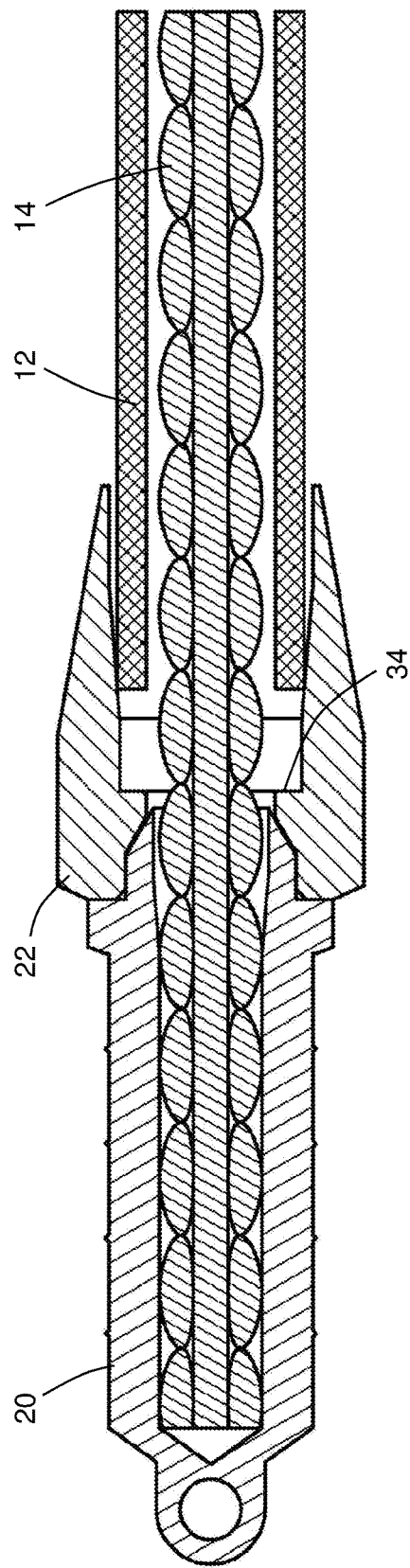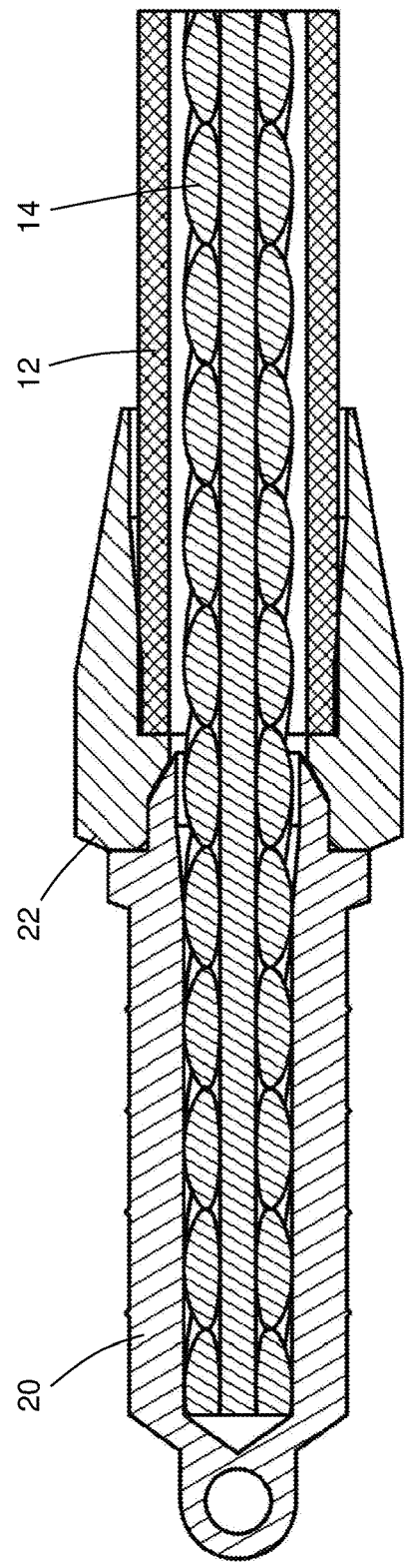

COMPONENT FOR REPLACING PIPES, METHOD OF USE, AND KIT OF PARTS FOR USE IN REMOVING PIPES

This application claims priority of UK patent application 1609000.3, filed May 23, 2016.

FIELD OF THE INVENTION

This invention relates to an improved component for replacing pipes, in particular underground pipes. The invention also relates to a method of using the improved component, and a kit of parts for use in removing pipes.

International patent application WO 2008/071997 discloses a trenchless method and apparatus for removing and/or replacing underground pipes (i.e. the pipe is removed (and replaced) without digging a trench along the length of the pipe). The ends of the pipe to be removed are exposed and a cable is passed along the pipe. The cable is connected to a removal component at the end of the pipe, and if required a replacement pipe is also attached to the component. The component is then pulled by the cable whereby the existing pipe is pulled from the ground and the replacement pipe is inserted in its place.

The present invention provides an improved removal component for use in the method described in WO 2008/071997 (and other similar methods). In order to avoid unnecessary repetition, the disclosure of WO 2008/071997 is incorporated herein.

The inventor has appreciated that an improved component is required in order to provide benefits over, and to reduce or overcome problems which have arisen during use of, the removal component used in practical applications of the method of WO 2008/071997.

In practical applications of the method of WO 2008/071997, the component is swaged onto the distal end of the cable. The material from which the component is made is typically a soft steel (such as 220M07) which can provide a swaged bond to the cable which is secure at the tensile forces applied during the method (a typical winch used to pull the cable and pipe from the ground can exert a tensile force of up to around 20 tonnes, for example).

The leading end of the component accommodates the distal end of the pipe to be removed, and specifically has a collar to surround the end of the pipe. The maximum cross-sectional dimension of the component is minimised and the collar has a relatively sharp leading end so as to minimise the force required to pull the component and pipe through the ground.

The method of WO 2008/071997 can be used to remove underground pipes up to around 25 m in length (or more, depending on ground conditions), and it is not uncommon for the proximal end of the pipe to be outside a building and the distal end to be inside the building. The component is typically secured to the end of the cable at a dedicated manufacturing location, and since the component is too large to pass along the pipe the cable is fed along the pipe from the distal end to the proximal end. The cable exits the proximal end of the pipe and is connected to the winch.

The cable is typically significantly longer than the pipe to be removed. Thus, whilst it is desirable to use a cable of the appropriate length for the pipe to be removed, a cable which is too short cannot be used and so operators typically utilise a cable which is known to be at least as long as required. It is therefore usually the case that the distal end of the cable, and the component which is secured thereto, are spaced some distance from the distal end of the pipe as the proximal end of the cable is being secured to the winch. The first stage of the winching operation is therefore to wind the "extra" length of the cable onto the magazine so as to pull the component into contact with the distal end of the pipe. After the component has engaged the distal end of the pipe the second stage of the winching operation can begin, namely pulling the pipe from the ground.

Whilst it is possible for one person to undertake a pipe removal operation according to WO 2008/071997, it is typically a two-person task, with one person located at the distal end of the pipe and the other person operating the winch. It is necessary that the operator at the distal end of the pipe be able to communicate with the person operating the winch during the first stage of the winching operation in order to ensure that the winch is stopped just before the component comes into contact with the distal end of the pipe. When the winch has been stopped the operator can properly align the component with the distal end of the pipe and pass the collar of the component around the distal end of the pipe as intended.

In practice, the relatively close fit between the leading end of the collar and the distal end of the pipe, and the relative inflexibility of the cable within the pipe, require the winch to be stopped with the component very close to the distal end of the pipe. It is not uncommon, for example, for the winch to be stopped too late, and if as is likely the component is improperly aligned with the end of the pipe a part of the collar can be distorted as it is forced against the distal end of the pipe. If a part of the collar becomes deformed outwardly it can significantly increase the force subsequently required to pull the pipe from the ground. If a part of the collar becomes deformed inwardly it can prevent the collar from passing around the end of the pipe as required.

In order to minimise the likelihood that the component is misaligned with the distal end of the pipe, it is known for the operator to hold the component during the first stage of the operation, and to seek to guide the component into correct alignment with the distal end of the pipe as the component is being pulled towards the distal end of the pipe by the winch. It will be appreciated that this is a particularly dangerous operation.

Often, the operator of the winch will stop the winch too early, and then actuate the winch for short periods to move the component towards the distal end of the pipe incrementally. Good communication is required between the operators during such a procedure, and it is tempting for the operator at the distal end of the pipe to seek to guide the component manually as it approaches the distal end of the pipe.

Also, it is not uncommon for the distal end of the pipe to be cut off at an angle, i.e. cutting the distal end of the pipe is seldom an accurate operation. The component is designed to fit to a square-cut end of the pipe and even a shallow angle at the pipe end can deform or distort the component. A steel pipe for example is often of harder material than the component and the component can be damaged and deformed by the non-square end of a steel pipe.

Also, if the distal end of the pipe is cut at an angle, then unless the component is deformed sufficiently to overcome the offset, the force exerted by the winch will be unbalanced across the pipe. Many pipes have a longitudinal seam and if too much force is applied to the pipe at the seam it is known for the pipe to split along the seam. In that eventuality, rather than pull the pipe from the ground, the winch instead pulls the component through the pipe, splitting the pipe longitudinally along the seam as it is pulled through the pipe.

SUMMARY OF THE INVENTION

According to the present invention there is provided an improved component for use in a trenchless method for removing a pipe, the component being securable to a cable and having a body with a recess within which the end of the pipe is located in use, the recess being surrounded by a collar, the improved component being a two-part component, the first part being securable to the cable and the second part including the body, the two parts being made of different materials.

The inventor has therefore appreciated that it is desirable for the component to have a relatively soft material for securement to the cable (as by swaging), and a relatively hard material for engaging the pipe. Providing a relatively hard material for engaging the pipe will reduce the likelihood that the collar will become damaged by forced engagement with the end of the pipe. Also, a harder-material collar provides a more rigid connection to the distal end of the pipe, even if the end of the pipe is cut at an angle, which thereby reduces the likelihood that the pipe will inadvertently be split.

Ideally, the second part is made from hard steel (such as EN8M). Such a material can be machined but is harder than the materials typically used for underground pipes, so that the second part will not likely be deformed or damaged by the distal end of the pipe, even if cut at an angle.

Desirably, the first part of the component is separable from the second part of the component. In use of such a component the second part can engage the distal end of the pipe as a preliminary stage of the operation (i.e. before the first stage described above), and even before the cable is inserted along the pipe. For example, the operator can fit the second part to the distal end of the pipe before the cable is fed along the pipe.

Preferably, the first and second parts of the component have cooperating elements which serve to align the first and second parts. Desirably, the first part has a projecting boss which can fit into a concavity of the second part. Desirably also the boss has a tapered exterior surface. It is not necessary that the concavity is correspondingly tapered but that can be provided if desired. Misalignment between the first and second parts can therefore be reduced or avoided, reducing the likelihood of an unbalanced force being applied to the pipe by the winch. Also, the cooperating elements allow the winch to pull the first component into engagement with the second component (which has previously been fitted to the end of the pipe) and to automatically align the first and second parts without requiring the winch to be stopped, and without requiring the operator to place his or her hands anywhere near the component.

Desirably, the recess has a cylindrical (non-tapering) form. Alternatively, the recess is tapered with the leading end being of larger diameter than the trailing end. In embodiments in which the recess is tapered, the leading end is ideally sized to be slightly larger than the outer diameter of the pipe to be removed and the trailing end is sized to be slightly smaller than the outer diameter. This means that the second part is a tight fit onto the end of the pipe. It is a feature of all embodiments that the operator can locate the second part in position upon the end of the pipe before the winch is operated, and perhaps also before the cable is fed along the pipe.

There is also provided a method of removing an underground pipe using the component as herein defined, comprising the following steps:

{i} identifying a pipe to be removed and cutting the pipe to expose its proximal and distal ends;
{ii} fitting the second part of the component to the distal end of the pipe;
{iii} inserting a cable through the pipe from the distal end to the proximal end, the distal end of the cable having the first part of the component secured thereto;
{iv} connecting the proximal end of the cable to a winch adjacent to the proximal end of the pipe;
{v} operating the winch to pull the cable through the pipe and to move the first part of the component into engagement with the second part; and
{vi} continuing to pull the cable so as to remove the pipe from the ground.

Ideally, the winch is not stopped (or slowed) during step {v}.

Preferably, a replacement pipe is also pulled into the ground during step vi.

BRIEF DESCRIPTION OF THE DRAWINGS

The invention will now be described in more detail, by way of example, with reference to the accompanying drawings, in which:

FIG. 2 shows a view as FIG. 1 at a later stage of the operation; and

FIG. 3 shows a view as FIG. 1 at an even later stage of the operation.

DETAILED DESCRIPTION

Figure 1:
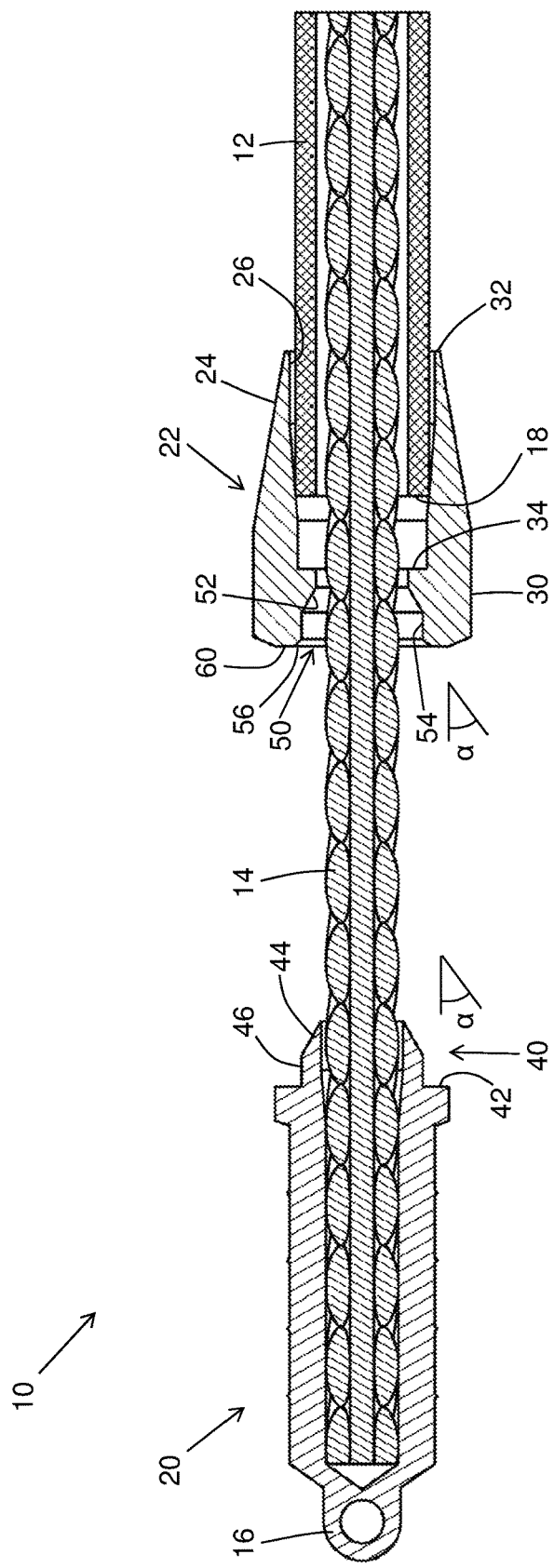
FIG. 1 shows a cross-sectional view of the improved component of the present invention, during an early stage of an operation to remove an underground pipe.

The improved component 10 which is shown in FIGS. 1-3 is designed for use in a trenchless method of removing an existing pipe 12 (such as a water or gas pipe serving a domestic building), and if desired inserting a replacement pipe (not shown) at the same time. As is described in WO 2008/071997, the existing pipe 12 may need to be replaced because it has become damaged for example.

Rather than removing the existing pipe 12 by excavating a trench along the length of the pipe, the component 10 is secured to a cable 14 and the cable can be pulled in order to remove the component 10 and the pipe 12 from the ground. The component 10 has an eyelet 16 whereby it can be temporarily secured to a replacement pipe, the replacement pipe being pulled into the hole from which the existing pipe 12 is removed, as the existing pipe is removed.

As is described in WO 2008/071997, an initial step in the method of pipe removal and replacement is to locate and open the ends of the length of pipe 12 to be removed. Typically, when removing a water supply pipe of a domestic building for example, the pipe will be cut at a location close to its entry into the building, and also close to the stop cock where the pipe crosses the property boundary. The component 10 will typically be fitted to the distal end 18 of the pipe 12 as shown (and which may in practice be located inside the building). The winch (not shown) will be located adjacent to the proximal end (also not shown) of the pipe 12, the terms "proximal" and "distal" being used in relation to the winch. Such an arrangement avoids the removed pipe being pulled into the building, with the consequent dirt and debris which will accompany the pipe 12 as it is removed. It will, however, be understood that the improved component 10 can be used regardless of the locations of the exposed ends of the pipe.

The component 10 comprises a first part 20 and a second part 22, which as seen in FIG. 1 can be physically separated from each other. The first part 20 is permanently secured (as by swaging) to the distal end of the cable 14, in known fashion. The first part 20 is therefore of a material suitable for forming a secure swaged bond with the cable, such as soft steel, e.g. 220M07.

The second part 22 has a collar 24 which surrounds a recess 26 which is sized to accommodate the distal end 18 of the pipe 12 as shown. The recess 26 is formed in the body 30 of the second part 22.

In this preferred embodiment the collar 24 is continuous. Alternatively, it would be possible to replace a continuous collar with a number of discrete "fingers" surrounding the recess 26. The term "collar" will be used in relation to the invention to embrace also a set of discrete fingers because the fingers in practice act as a continuous collar.

As is typical, the pipe 12 is circular in cross-section and the recess 26 and collar 24 are correspondingly circular. In common with the known components for use in trenchless pipe removal applications, the recess 26 tapers slightly, the leading end 32 having an inner diameter which is slightly larger than the outer diameter of the pipe 12, the trailing end 34 having an inner diameter which is slightly smaller than the outer diameter of the pipe 12. In an alternative embodiment the recess does not taper and has the same inner diameter along its length, which diameter is slightly larger than the outer diameter of the pipe 12.

It is desirable that the inner diameter of the recess (or at least the inner diameter of the leading end 32 in embodiments having a tapered recess) is slightly larger than the outer diameter of the pipe 12 so that the collar 24 can easily be fitted over the distal end of the pipe (and can accommodate slight ovality in the pipe 12). In tapering embodiments such as that shown in the drawings, the inner diameter of the trailing end 34 may be slightly smaller than the outer diameter of the pipe; whilst this is not necessary for the present invention it can permit the distal end of the pipe 12 to be securely clamped within the collar 24.

The outer periphery of the collar 24 is tapered and has a relatively sharp leading end 32, in known fashion, so as to reduce the force required to pull the component 10 through the ground in use.

During a pipe removal operation with the invented component 10, the second part 22 is firstly fitted to the distal end 18 of the pipe 12. This step is undertaken before the stage represented in FIG. 1, and ideally before the cable 14 is inserted into the pipe 12. Without the cable 14, it will be understood that the operator can easily and safely place the collar 24 around the distal end 18 of the pipe 12 so as to temporarily secure it in place. In tapering embodiments such as that shown in the drawings, the operator may hammer the second part 22 into place, during which the distal end of the pipe 12 may become tightly engaged (and perhaps slightly compressed) by the converging sidewall of the recess 26.

FIG. 1 represents the second part 22 as it would be positioned when temporarily secured to the pipe 12. The exact position of the second part 22 relative to the pipe 12 at this initial stage of the operation, and whether or not the second part 22 is hammered into place, is not relevant to the method of operation; all that is required is that the second part 22 is temporarily secured to the distal end of the pipe 12, and is substantially aligned with the pipe 12, as shown in FIG. 1. In embodiments in which the recess is not tapered, it will be understood that the second part can be fitted to the pipe 12 so that the distal end of the pipe 18 engages the trailing end 34 of the recess.

The cable 14, including the pre-fitted first part 20, is then fed along the pipe 12, from the distal end 18 to the proximal end. The proximal end of the cable is then connected to the winch adjacent to the proximal end (not shown), in known fashion. The relative positions of the components as shown in FIG. 1 represent the positions which might occur in practice as the cable 14 is being secured to the winch, i.e. the first part 20 is some distance from the second part 22 due to the operator deliberately choosing to use a cable 14 which is somewhat longer than required.

After the proximal end of the cable 14 has been connected to the winch, the winch is actuated to pull the cable 14 through the pipe 12 towards the proximal end of the pipe. Initially, the extra length of cable 14 is taken up, and the first part 20 is pulled towards the second part 22 (i.e. the first part 20 moves from the position of FIG. 1 to the position of FIG. 2).

It will be observed that the leading end of the first part 20 has a projecting boss 40 which terminates at a flange 42. In this embodiment the boss comprises a cylindrical part 46 and a tapered part 44. The tapered part 44 has a taper angle $\alpha$, which in this embodiment is 30°.

The trailing end of the body 30 of the second component 22 has a concavity 50 of a size and shape to accommodate the boss 40. Specifically, the concavity 50 has a tapered part 52, a cylindrical part 54, and a chamfer 56. The taper angle $\alpha$ of the tapered part 52 matches the taper angle $\alpha$ of the tapered part 44 of the first part 20 and the length of the cylindrical part 54 plus the length of the chamfer 56 matches the length of the cylindrical part 46 of the boss 40.

The cross-sectional dimension of the flange 42 (which is ideally the diameter of a circular flange) is larger than the maximum diameter of the concavity 50 (the maximum diameter of the concavity 50 being defined by the chamfer 56), so that when the first and second parts 20, 22 are brought together the flange rests against the surface 60 at the trailing end of the body 30 as seen in FIG. 2.

As the pipe 18 is being pulled from the ground, the tension in the cable 14 is transmitted to the second part 22 by way of the flange 42 contacting the end surface 60, although as seen in FIG. 3 the tapered parts 44 and 52 are also in engagement and therefore also transmit some of the tensile force.

In an alternative embodiment the tapered part 52 is omitted from the concavity 50, so that the cylindrical part 54 continues to the bottom of the concavity. In a further alternative embodiment the cylindrical part 46 may be omitted from the boss of the first part (so that the tapered part 44 is connected directly to the flange 42). In this latter embodiment a tapering boss therefore locates into a cylindrical concavity, it being recognised that the cooperating elements are provided only to align the first and second components and do not also transmit any of the tensile force from the first component to the second component. In such alternative embodiments the tapered part 44 of the boss can share the same taper angle $\alpha$ as the embodiment shown in the drawings, i.e. 30°.

In this embodiment the flange 42 and the end surface 60 are both planar and continuous and such an arrangement is preferred. In alternative embodiments the flange and end surface are non-planar cooperating surfaces (for example slightly concave, slightly convex, or stepped). Also, it is not necessary that the surfaces are continuous and the surfaces could if desired be made discontinuous. It will therefore be understood that it is only necessary that the second component can be driven by the first component by way of their cooperating surfaces.

It will be understood that the chamfer 56 and the tapered surface 44, as well as the gap between the cable 14 and the cylindrical surface 54, help to ensure that the boss 40 will always enter the concavity 50, even if the first part 20 and second part 22 are misaligned as they are brought together by the winch. It is therefore not necessary for the operator to manually guide the first and second parts together, nor for the winch to be stopped as the first and second parts come into contact. This advantage is shared with all of the disclosed embodiments, including those having different cooperating (alignment) elements.

The second part 22 therefore provides a seating for the first part 20. This provides significant advantages over the prior art arrangements in which the seating for the removal component is the cut end of the pipe, which seating is of variable form dependent upon how the pipe was cut by the operator, and the material from which the pipe is made.

Whilst the prior art arrangements require the operator to ensure that the removal component is correctly seated on the distal end of the pipe, which in turn requires the winch to be stopped at the correct time and the operator to align the component with the distal end of the pipe (usually manually), the two-part component of the present invention avoids any operator involvement at the distal end of the pipe after the winch has been actuated.

A subsequent stage of the operation is shown in FIG. 3, and again whilst the winch continues to operate. The change between FIGS. 2 and 3 is that the winch has forced the second part 22 into engagement with the distal end 18 of the pipe 12, or alternatively stated the winch forces the collar 24 further over the distal end of the pipe until the end 18 of the pipe engages the trailing end 34 of the recess 26. It will be understood that this subsequent stage only occurs in embodiments having a tapered recess 26 with a trailing end smaller than the end of the pipe; in embodiments having a cylindrical recess 26 the operator can fit the second part with the trailing end of the recess engaging the distal end of the pipe, as above explained.

It will be understood that the winch used for the removal of underground pipes can typically apply tensile loads in excess of 20 tonnes. In certain applications utilising a tapering recess 26, however, the difference between the inner diameter of the trailing end 34 and the outer diameter of the pipe 18 is too large for the pipe to be forced all the way to the trailing end 34 so that there remains a gap between the distal end 18 of the pipe and the trailing end 34 whilst the pipe is pulled from the ground.

Whilst the figures show that the distal end of the pipe 12 has been cut square, so that the distal end of the pipe engages the trailing end 34 of the recess 26 uniformly around its full circumference, that will not be a typical situation. In practice, the distal end of the pipe 12 is likely to have been cut at an angle (even by the most diligent of operators), and might have a complex form if the operator partially cut the end of the pipe from two different directions. By arranging the second part 22 to be of a relatively hard material such as hard steel or the like, and in particular a material which is harder and more rigid than the pipe 12, any mis-shaping of the distal end of the pipe results in the pipe being deformed rather than the second part 22. The likely result of any deformation of the pipe is that the pipe is compressed towards the cable 14 as it is forced into the recess 26, reducing any tendency of the pipe to split (especially if the pipe has a longitudinal seam). The use of a hard material for the collar 24 (and in particular a harder material than the pipe 12) therefore helps to ensure that the collar is maintained substantially aligned with the cable 14 during pipe removal, minimising the force required to remove the pipe.

One method of removing a pipe 12 using the component 10 will now be described (notwithstanding the similarity with the method described in WO 2008/071997) in relation to the removal of an underground water pipe 12 serving a domestic building (not shown). The pipe 12 has its ends exposed as set out above. The second part 22 is temporarily secured to the distal end of the pipe 12 (suitably by the operator manually fitting the collar 24 over the distal end 18 of the pipe). The end of the cable 14 which is not fitted with the first part 20 is fed along the pipe from the distal end 18 towards the winch, and is connected to the winch. The winch is actuated so as to apply tension to the cable and move the first part 20 into engagement with the second part 22, then fully to seat the second part 22 upon the distal end of the pipe (if required), and then to pull the cable 14 and pipe 12 from the ground.

If desired, in known fashion a settable fluid may be introduced into the pipe 12 so as to reduce the likelihood that the pipe 12 will distort during removal. If also desired, in known fashion a replacement pipe may be connected to the eyelet 16. For example, a replacement pipe with a towing component is connected to the eyelet 16 with a suitable shackle.

It will be understood that the second part 22 is sized to cooperate with a pipe 12 of a particular outer diameter. To remove pipes of a different diameter will require a different second part. However, it will also be understood that different second parts can all be provided with a concavity of the second part 22 having standard dimensions to cooperate with the boss of the first part 20 also having standard dimensions. In this way, the operator can use the same cable 14 and first part 20 with different second parts 22, only the second part 22 needing to be changed dependent upon the diameter of the pipe being removed. This can be very beneficial in practice as the operator will not necessarily know the diameter of the pipe to be removed before accessing the site. The fact that the operator can provide one thickness of cable 14 (albeit perhaps in differing lengths) fitted with one design of first part 20, significantly reduces the stockholding required, and reduces the likelihood that the operator will not have the components required to complete the pipe removal. The second part 22 is relatively small and the operator can readily carry a large number of differently-sized second parts which between them are suited to all pipes which might be encountered.

Despite its advantages, however, the component 10 is relatively cheap to manufacture, its cost of a few Pounds Sterling being sufficiently small to allow the operator readily to dispose of the component (with the removed pipe 12 and cable 14) after a single use. The relatively low cost can readily be included in the costing of the pipe removal operation.

The invention claimed is:

1. A pipe-removal assembly for use in a trenchless method for removing a pipe, the assembly comprising a cable and a two-part pipe-removal component with a first part permanently secured to the cable and a second part which is separate to the first part, the first part and the second part being made of different materials, the second part having a body with a recess to accommodate the end of the pipe to be removed in use, the recess being surrounded by a collar, the first part and the second part having cooperating elements configured to align the first and second parts, the cooperating elements comprising a projecting boss of the first part which is sized to fit into a concavity of the second part.

2. The assembly according to claim 1 in which the boss has a tapered leading end.

3. The assembly according to claim 2 in which the taper angle (α) is between 20° and 40°.

4. The assembly according to claim 2 in which the concavity has a cylindrical interior surface.

5. The assembly according to claim 2 in which the taper angle (α) is 30°.

6. The assembly according to claim 1 in which the concavity of the second part has a chamfered opening.

7. The assembly according to claim 1 in which the second part has an end surface and the first part has a cooperating flange.

8. The assembly according claim 7 in which the end surface and the flange are both continuous, and in which the end surface and flange are both substantially planar.

9. The assembly according to claim 1 in which the collar is continuous.

10. A kit of parts for removing underground pipes, the kit comprising:
a number of pipe-removal assemblies according to claim 1, the number of pipe-removal assemblies including cables of differing lengths, each cable having two ends, the first part of a respective pipe-removal component permanently secured to one of the two ends of each of the cables in the kit,
the number of pipe-removal assemblies also including second parts having recesses with different diameters whereby different second parts can accommodate the end of different diameter pipes to be removed, the projecting boss of each of the first parts in the kit having the same dimensions,
and the concavity of each of the second parts in the kit having the same dimensions, whereby each of the second parts in the kit can cooperate with every one of the first parts in the kit.

11. A method of removing an underground pipe using a component which is securable to a cable and having a body with a recess to accommodate the end of the pipe in use, the recess being surrounded by a collar, the component being a two-part component, a first part being permanently secured to the cable and a second part including the body, the two parts being made of different materials, the method comprising the following steps:
{i} identifying a pipe to be removed and cutting the pipe to expose its proximal and distal ends;
{ii} fitting the second part of the component to the distal end of the pipe;
{iii} inserting a cable through the pipe from the distal end to the proximal end, the distal end of the cable having the first part of the component secured thereto;
{iv} connecting the proximal end of the cable to a winch adjacent to the proximal end of the pipe;
{v} operating the winch to pull the cable through the pipe and to move the first part of the component into engagement with the second part; and
{vi} continuing to pull the cable so as to remove the pipe from the ground.

12. The method according to claim 11 in which the winch is not stopped during step {v}.

13. A method of removing an underground pipe using a kit of parts, the kit comprising:
a number of tensile cables of differing lengths, each cable having two ends, a respective first part of a two-part pipe removal component permanently secured to one of the two ends of each of the number of tensile cables in the set,
a number of second parts of a two-part pipe removal component, each of the second parts in the kit having a body with a recess to accommodate the end of a pipe to be removed, the recess being surrounded by a collar, the respective recesses of the number of second parts in the kit having differing diameters whereby different second parts in the kit can accommodate the end of different diameter pipes to be removed,
all of the first parts in the kit having a projecting boss with the same dimensions,
and all of the second parts in the kit having a concavity with the same dimensions, whereby each of the second parts in the kit can cooperate with every one of the first parts in the kit, the first part and each of the second parts being made of different materials, the method comprising the following steps:
{i} identifying a pipe to be removed and cutting the pipe to expose its proximal and distal ends;
{ii} selecting a second part from the number of second parts in the kit dependent upon the outer diameter of the pipe to be removed, the selected second part having a recess which is larger than the outer diameter;
{iii} fitting the second part of the two-part component to the distal end of the pipe to be removed;
{iv} inserting a cable through the pipe from the distal end to the proximal end, the distal end of the cable having the first part of the two-part removal component permanently secured thereto;
{v} connecting the proximal end of the cable to a winch adjacent to the proximal end of the pipe;
{vi} operating the winch to pull the cable through the pipe and to move the first part of the two-part component into engagement with the second part of the two-part component; and
{vii} continuing to pull the cable so as to remove the pipe from the ground.

* * * * *